(12) United States Patent
Kawai

(10) Patent No.: US 7,779,108 B2
(45) Date of Patent: Aug. 17, 2010

(54) NETWORK PRINTER MANAGEMENT SYSTEM, METHOD, AND COMPUTER READABLE MEDIUM FOR MANAGING A PLURALITY OF NETWORK PRINTERS INCLUDING A PRINTER DIRECTLY CONNECTED TO A NETWORKED PERSONAL COMPUTER DEVICE

(75) Inventor: Sunao Kawai, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 222 days.

(21) Appl. No.: 11/780,294

(22) Filed: Jul. 19, 2007

(65) Prior Publication Data

US 2008/0021991 A1 Jan. 24, 2008

(30) Foreign Application Priority Data

Jul. 20, 2006 (JP) .............................. 2006-198126

(51) Int. Cl.
G06F 15/173 (2006.01)
G06F 15/16 (2006.01)
G06F 3/00 (2006.01)
G06F 3/12 (2006.01)
G06K 15/00 (2006.01)

(52) U.S. Cl. ................. 709/223; 709/203; 709/218; 710/5; 710/11; 710/46; 358/1.15; 358/1.18

(58) Field of Classification Search .................. 709/223
See application file for complete search history.

(56) References Cited

U.S. PATENT DOCUMENTS 6,201,611 B1 * 3/2001 Carter et al. ............... 358/1.15

(Continued)

FOREIGN PATENT DOCUMENTS

JP  H08-166912 A  6/1996

(Continued)

OTHER PUBLICATIONS

Japanese Patent Office, Office Action, Notification of Reasons of Rejection, for Japanese Patent Application No. JP2006-198126, dispatched Aug. 26, 2008. (counterpart to the above-captioned U.S. patent application.).

(Continued)

*Primary Examiner*—Joseph E Avellino
*Assistant Examiner*—Patrick Nagel
(74) *Attorney, Agent, or Firm*—Baker Botts L.L.P.

(57) ABSTRACT

According to an aspect of the invention, there is provided a device management system, which comprises a first device connected to a network, an information processing device connected to the network, a second device connected to the information processing device, and a management device connected to the network. The management device comprises: a request judgment unit configured to accept a request regarding management and to judge whether a target device of the request is the first device or the second device based on a database; a first management unit configured to transmit the first management command to the first device in accordance with a first protocol; and a second management unit configured to transmit the second management command to the information processing device in accordance with a second protocol. The information processing device comprises a command relaying unit configured to send the second management command to the second device.

17 Claims, 6 Drawing Sheets

U.S. PATENT DOCUMENTS

| | | | |
|---|---|---|---|
| 6,490,052 B1 * | 12/2002 | Yanagidaira | 358/1.15 |
| 6,621,823 B1 | 9/2003 | Mellquist et al. | |
| 2001/0053295 A1 * | 12/2001 | Kujirai et al. | 399/79 |
| 2002/0083431 A1 * | 6/2002 | Machida | 717/174 |
| 2002/0118387 A1 * | 8/2002 | Patton | 358/1.15 |
| 2002/0140971 A1 * | 10/2002 | Machida | 358/1.15 |
| 2002/0167685 A1 * | 11/2002 | Lee | 358/1.18 |
| 2002/0191211 A1 * | 12/2002 | Miller et al. | 358/1.15 |
| 2004/0218212 A1 * | 11/2004 | Jang et al. | 358/1.15 |
| 2005/0134904 A1 * | 6/2005 | Voskuil | 358/1.15 |

FOREIGN PATENT DOCUMENTS

| | | |
|---|---|---|
| JP | 2000-010747 A | 1/2000 |
| JP | 2000-172600 A | 6/2000 |
| JP | 2000-200232 A | 7/2000 |
| JP | 2000207321 A | 7/2000 |
| JP | 2000293324 A | 10/2000 |
| JP | 2002-007235 A | 1/2002 |
| JP | 2002-157174 A | 5/2002 |
| JP | 2005-038296 A | 2/2005 |
| JP | 2006-163772 A | 6/2006 |

OTHER PUBLICATIONS

Japanese Patent Office, Notification of Reasons of Rejection mailed Nov. 18, 2008, in priority Patent Application No. JP 2006-198126.

* cited by examiner

| | | DEVICE MANAGEMENT TOOL | | |
|---|---|---|---|---|
| | | PRINTER LIST | | |
| | | TYPE | CONNECTION | ADDRESS |
| 32a |  | MFP | LOCAL(PC01) | 192.168.0.100 |
| 32b |  | MFP | NETWORK | 192.168.0.201 |
| 32c |  | PRINTER | LOCAL(PC01) | 192.168.0.100 |
| 32d |  | MFP | LOCAL(PC02) | 192.168.0.101 |
| 32e |  | PRINTER | NETWORK | 192.168.0.202 |
FIG. 2

Printer Setup

| TYPE | CONNECTION | ADDRESS |
|---|---|---|
| MFP | NETWORK | 192.168.0.200 |
| PRINTER | LOCAL(PC01) | 192.168.0.100 |
| MFP | LOCAL(PC02) | 192.168.0.101 |
| PRINTER | NETWORK | 192.168.0.202 |

Emulation: AUTO
Feeder: Auto
Duplex Mode: ○ ON  ⊙ OFF
Duplex Binding: ⊙ Long Edge Binding  ○ Short Edge Binding
Media Type: Plain paper
Resolution: 600
High Resolution Control: MEDIUM
Page Protection: Auto
Copy [1-999]: 1
Continue: ○ Auto  ⊙ Manual
Toner Save: ○ ON  ⊙ OFF
Power Save [1-240]: 30 Minute(s)

Cancel   Submit

NETWORK PRINTER MANAGEMENT SYSTEM, METHOD, AND COMPUTER READABLE MEDIUM FOR MANAGING A PLURALITY OF NETWORK PRINTERS INCLUDING A PRINTER DIRECTLY CONNECTED TO A NETWORKED PERSONAL COMPUTER DEVICE

CROSS-REFERENCE TO RELATED APPLICATION

This application claims priority under 35 U.S.C. §119 from Japanese Patent Application No. 2006-198126, filed on Jul. 20, 2006. The entire subject matter of the application is incorporated herein by reference.

BACKGROUND

1. Technical Field

Aspects of the present invention relate to a device management system for managing devices in a network.

2. Related Art

Device management systems configured to manage devices directly connected to a network in accordance with a network device management protocol such as an SNMP (Simple Network Management Protocol) have been proposed. In such a system, an application program having a management function (e.g., a SNMP manager function) of managing network devices (devices connected to the network) is used.

The SNMP is able to manage network devices directly connected to the network. However, the SNMP is not able to manage devices (local devices) connected, for example, to a personal computer (which is connected to the network) through an interface such as a USB (Universal Serial Bus) or a parallel port because the local devices are managed under control of the personal computer.

Japanese Patent Provisional Publication No. 2000-293324 (hereafter, referred to as JP2000-293324A) discloses a device management system configured to manage a local device by implementing a dedicated program on a PC (personal computer) to which the local device is connected. The dedicated program has a function of responding to a packet under SNMP.

However, the dedicated program implemented on the PC has a relatively complicated structure. Therefore, the system disclosed in JP2000-293324A has a drawback that the development of the dedicated application program increases the cost of the system. In addition, in the system disclosed in JP2000-293324A, it is impossible to control, on a management device, local and network devices while appropriately distinguishing a local device from a network device. Further, the system is not able to support management of the case where more than one local device is connected to the PC.

SUMMARY

Aspects of the present invention are advantageous in that it provides a device management system capable of managing both local and network devices in a network while making it possible to distinguish a local device from a network device.

According to an aspect of the invention, there is provided a device management system, which comprises at least one first device connected to a network, an information processing device connected to the network, at least one second device connected to the information processing device, and a management device connected to the network. The management device comprises: a request judgment unit configured to accept a request regarding management of one of the at least one first device and the at least one second device and to judge whether a target device of the request is the at least one first device or the at least one second device; a database in which first commands for the at least one first device and second commands for the at least one second device are stored such that, for each of types of requests regarding management of one of the at least one first device and the at least one second device, each of the first commands is associated with corresponding one of the second commands; a first management command generation unit configured such that if the request judgment unit judges that the target device of the accepted request is the at least one first device, the first management command generation unit reads the first command matching the accepted request from the database, generates a first management command to be processed by the at least one first device using the read first command, and transmits the first management command to the at least one first device in accordance with a first protocol; and a second management command generation unit configured such that if the request judgment unit judges that the target device of the accepted request is the at least one second device, the second management command generation unit reads the second command matching the accepted request from the database, generates a second management command to be processed by the at least one second device using the read second command, and transmits the second management command to the information processing device in accordance with a second protocol.

In this configuration, the information processing device comprises a command relaying unit configured to receive the second management command from the management device and to send the second management command to the at least one second device.

The above mentioned configuration of the management system eliminates the need for implementing a dedicated application (enabling the information processing device to support a network management protocol) on the information processing device. Therefore, it becomes possible to manage local devices on the management device in a concentrated manner. It is possible to appropriately manage the local and network devices while enabling a user to appropriately distinguish the local device from the network device.

According to another aspect of the invention, there is provided a management device connected to a network. The management device comprises: a request judgment unit configured to accept a request regarding management of one of at least one first device connected to a network and at least one second device connected to an information processing device connected to the network, and to judge whether a target device of the request is the at least one first device or the at least one second device; a database in which first commands for the at least one first device and second commands for the at least one second device are stored such that, for each of types of requests regarding management of one of the at least one first device and the at least one second device, each of the first commands is associated with corresponding one of the second commands; a first management command generation unit configured such that if the request judgment unit judges that the target device of the accepted request is the at least one first device, the first management command generation unit reads the first command matching the accepted request from the database, generates a first management command to be processed by the at least one first device using the read first command, and transmits the first management command to the at least one first device in accordance with a first protocol; and a second management command generation unit configured such that if the request judgment unit judges that the target device of the accepted request is the at least one second device, the second management command generation unit reads the second command matching the accepted request from the database, generates a second management command to be processed by the at least one second device using the read second command, and transmits the second management command to the information processing device in accordance with a second protocol.

The above mentioned configuration of the management device eliminates the need for implementing a dedicated application (enabling the information processing device to support a network management protocol) on the information processing device. Therefore, it becomes possible to manage local devices on the management device in a concentrated manner. It is possible to appropriately manage the local and network devices while enabling a user to appropriately distinguish the local device from the network device.

According to another aspect of the invention, there is provided a computer readable medium having computer readable instruction stored thereon, which, when executed by a processor of a management device, configures the processor to perform the steps of: accepting a request regarding management of one of at least one first device connected to a network and at least one second device connected to an information processing device connected to the network; judging whether a target device of the request is the at least one first device or the at least one second device; if it is judged that the target device of the accepted request is the at least one first device, reading a first command matching the accepted request from a database in which first commands for the at least one first device and second commands for the at least one second device are stored such that, for each of types of requests regarding management of one of the at least one first device and the at least one second device, each of the first commands is associated with corresponding one of the second commands, generating a first management command to be processed by the at least one first device using the read first command, and transmitting the first management command to the at least one first device in accordance with a first protocol; and if it is judged that the target device of the accepted request is the at least one second device, reading the second command matching the accepted request from the database, generating a second management command to be processed by the at least one second device using the read second command, and transmitting the second management command to the information processing device in accordance with a second protocol.

The above mentioned configuration for the management device eliminates the need for implementing a dedicated application (enabling the information processing device to support a network management protocol) on the information processing device. Therefore, it becomes possible to manage local devices on the management device in a concentrated manner. It is possible to appropriately manage the local and network devices while enabling a user to appropriately distinguish the local device from the network device.

According to another aspect of the invention, there is provided a device management system, which comprises at least one first device connected to a network; an information processing device connected to the network; at least one second device connected to the information processing device; and a management device connected to the network. The management device comprises a request accepting unit configured to accept a request regarding management of one of the at least one first device and the at least one second device; and a controller that converts information inputted as the request through the request accepting unit to a command according to whether the request is targeted for the at least one first device or the at least one second device, and that transmits the command to one of the at least one first device and the information processing device according to whether the request is targeted for the at least one first device or the at least one second device. The information processing device comprises a command relaying unit configured to receive the command from the controller of the management device and to send the received command to the at least one second device.

The above mentioned configuration for the management device eliminates the need for implementing a dedicated application (enabling the information processing device to support a network management protocol) on the information processing device. Therefore, it becomes possible to manage local devices on the management device in a concentrated manner. It is possible to appropriately manage the local and network devices while enabling a user to appropriately distinguish the local device from the network device.

According to another aspect of the invention, there is provided a device management system, which comprises at least one first device connected to a network; an information processing device connected to the network; a plurality of second devices connected to the information processing device; and a management device connected to the network. The management device comprises a request accepting unit configured to accept a request regarding management of one of the at least one first device and the plurality of second devices; and a controller configured such that if one of the plurality of second devices is designated as a target device in the inputted request, the controller transmits a command corresponding to the request to the information processing device together with an identification of the target device. The information processing device comprises a command relaying unit configured to receive the command from the controller of the management device and to send the received command to the target device in accordance with the identification transmitted from the management device together with the command.

Such a configuration makes it possible to manage local devices on the management device in a concentrated manner even if a plurality of second devices (e.g., a plurality of local printers) are connected to the information processing device.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 2 illustrates an example of a printer list screen displayed on a PC by a web browser running on the PC.

FIG. 3 illustrates an example of a setting input screen displayed on the PC.

DETAILED DESCRIPTION

Hereafter, an embodiment according to the invention will be described with reference to the accompanying drawings.

Figure 1:
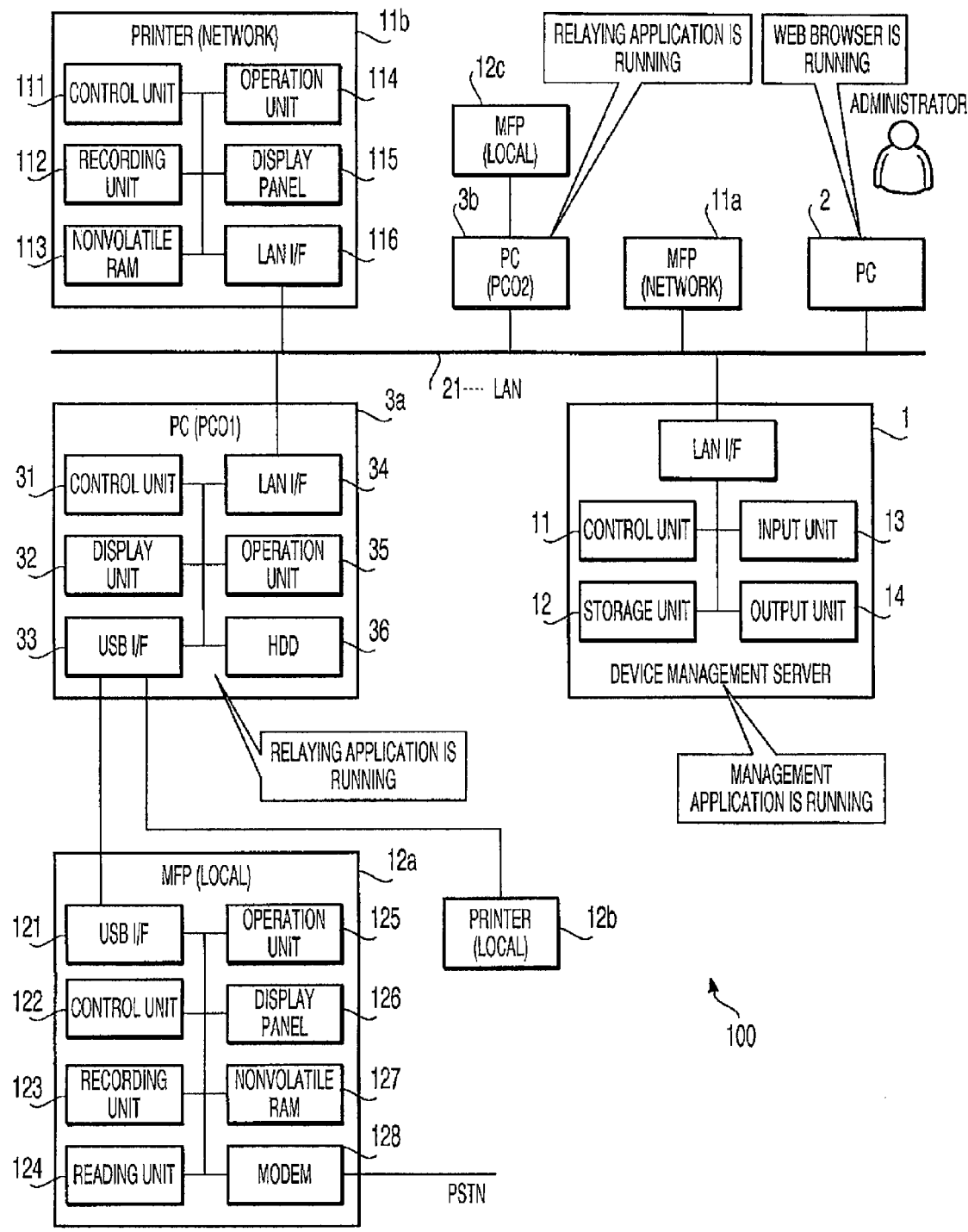
FIG. 1 is a block diagram illustrating an entire configuration of a printer management system 100 according to an embodiment of the invention.

FIG. 1 is a block diagram illustrating an entire configuration of a printer management system 100 according to an embodiment of the invention. As shown in FIG. 1, the printer management system 100 includes a device management server 1, a PC (personal computer) 2, PCs (personal computers) 3a and 3b, an MFP (multifunction peripheral) 12a locally connected to the PC 3a, a printer (local printer) 12b locally connected to the PC 3a, an MFP (multifunction peripheral) 12c locally connected to the PC 3b, an MFP (multifunction peripheral) 11a, and a printer 11b. The device management server 1, the PCs 2, 3a and 3b, the MFP 11a, and the printer 11b are cummunicatably connected to a LAN (Local Area Network) 21.

The device management server 1 may be formed of a server having relatively high processing performance. As shown in FIG. 1, the device management server 1 includes a control unit 11 having a CPU, ROM and RAM, a storage unit 12 (i.e., a hard disk drive), an input unit 12 through which user instructions are inputted, and an output unit 13 through which information is outputted. The device management server 1 may be formed of a personal computer.

Since the PCs 2, 3a, and 3b have the same configuration, a detailed configuration is explained only for the PC 3a and explanations of configuration of the PCs 2 and 3b are not repeated. The PC 3a includes a control unit 31 (having a CPU, ROM and RAM), a display unit 32, a USB interface 33, a LAN interface 34, an operation unit 35 (e.g., a keyboard and a mouse), and an HDD (functioning as a storage unit) 36.

The PC 2 is provided with a function as a web browser for browsing a web page. To the PC 3a, the MFP 12a and the printer 1b are connected through the USB interface 33. Device drivers for controlling the MFP 12a and the printer 12b are installed on the PC 3a. To the PC 3b, the MFP 12c is connected through the USB interface 33 of the PC 3b. A device driver for controlling the MFP 12c is installed on the PC 3b.

A relaying application is installed on each of the PCs 3a and 3b. On each of the PCs 2, 3a and 3b, the relaying application is running continuously during a power-on state. The relaying application has a function of returning device information (e.g., a printer name and a serial number) of a printer locally connected to a PC (3a or 3b) on which the relaying application runs, to the device management server 1 which has transmitted an inquiry to the PC (3a or 3b), as a response to the inquiry. In addition, the relaying application has a function of transmitting a PJL command received from the device management server 1, to a printer locally connected the PC on which the relaying application runs. Since the PCs 3a and 3b have the same function, each of the PCs 3a and 3b is generically called a PC 3.

Since the MFPs 11a, 12a and 12c have the same configuration and the same function, a detailed configuration is explained only for the MFP 12a and explanations of configuration of the MFPs 11a and 12c are not repeated. As shown in FIG. 1, the MFP 12a has a printing function, a copying function, a scanner function and a facsimile function. The MFP 12a includes a USB interface 121, a control unit 122, a recording unit 123, a reading unit 124, am operation unit (e.g., operation keys) 123, a display panel 126, a nonvolatile RAM 127 and a modem 128.

The control unit 122 includes a CPU, a ROM and a RAM, and controls internal components of the MFP 12a. The recording unit 123 functions as a printing device which forms images on a recording medium (e.g., a sheet of paper). The reading unit 124 function as a scanner device which reads information from an original placed on a original base through an image pick-up device (e.g., a CCD) and generates image data of the image.

The operation unit 125 includes keys through which user operation is conducted. Data (instructions or information) inputted by a user through the operation unit 125 is processed by the control unit 122. The display panel 126 is, for example, a liquid crystal display, and is used to display information. The nonvolatile RAM is used to store various types of information to be used as setting for the various functions of the MFP 12a. The modem 128 is connected to a PSTN (Public Switched Telephone Network) and is used to execute facsimile communication with an external facsimile device connected to the PSTN.

Each of the printers 11b and 12b is configured to have a single printing function. As shown in FIG. 9, the printer 11b includes a control unit 111, a recording unit 112, a nonvolatile RAM 113, a operation unit 114 (e.g., operation keys), a display panel 115, and a communication interface (a LAN interface and a USB interface) 116. These internal components of the printer 11b are also provided in the printer 12b.

Each of the MFP 11a and the printer 11b has a LAN interface as a communication interface. That is, each of the MFP 11a and the printer 11b is a network device connected directly to the LAN 21 via the LAN interface. Each of the MFP 11a and the printer 11b has a communication function supporting a SNMP (Simple Network Management Protocol) and has a function of functioning as an agent as a management target under the SNMP. The SNMP is a protocol for monitoring and controlling devices connected to a network. Each of management target devices has a MIB (Management Information base) in which information to be used under SNMP is described. A device functioning as a management device under the SNMP refers to the MIB of a target device and changes data of MIB of a target device on an as needed basis. In the printer management system 100, the device management server 1 function as a management device under SNMP.

Each of the MFPs 12a and 12c and the printer 12b has an USB interface as a communication interface. Each of the MFP 12a and the printer 12b is locally connected to the USB interface 33 of the PC 3a, and the MFP 12c is locally connected to the USB interface of the PC 3b. That is, each of the MFP 12a the printer 12b is a local device controlled by the PC 3a, and the MFP 12c is a local device controlled by the PC 3b. Since each of the MFPs 12a and 12c and the printer 12b has a printing function, each of the MFPs 12a and 12c and the printer 12b is frequently referred to as a local printer hereinafter. These local printers support PJL (Printer Job Language). PJL is a command language for controlling various functions implemented in printers (e.g., the MFPs 12a and 12c and the printer 12b).

Since the MFP 11a and the printer 11b are directly connected to the LAN 21, these devices are frequently referred to as network printers hereinafter. In the following, the term "printing device" as used herein means a device having a printing function (i.e., the local and network printers are generally called "printing devices").

As described in detail below, the device management server 1 has a function of managing device information (information on a device). The managing of device information includes obtaining device information from a management target and changing device information of a management target.

On the device management server 1, a management application is running as one of application programs. The management application has a function of collecting device information of the network printers (i.e., MFP 11a and the printer 11b) and the local printers (i.e., the MFPs 12a and 12c and the printer 12b), generating printer management information based on the collected device information, and providing the printer management information to the PC 2 in the form of a web page. The management application further has a function of accepting a request regarding management of each printing device inputted by an administrator through a form described in the web page, and generating a management command corresponding to the request, and transmitting the management command to a management target.

The management application has a GUI (Graphical User Interface) used for a printer management screen. The GUI includes a screen for displaying device information concerning printing devices (see FIG. 2) and an input screen through which setting information for printing devices is inputted (see FIG. 3). The GUI is generated in the form of a web page described by an HTML (HyperText Markup Language). The web page is provided for the PC 2, and is displayed on the display unit of the PC2 by a web browser running on the PC 2.

In the printer management system 100, the administrator is allowed to access the management application running on the device management server 1 through the web browser of the PC 2 so that management of printing devices can be achieved through the screens (see FIGS. 2 and 3) displayed on the PC 2 as web pages.

Hereafter, one of functions to be achieved by the management application is described. In the following, a procedure for changing setting information of printing devices by the administrator is described.

When the administrator instructs the management application running on the device management server 1 to search for printing devices existing on the network (i.e., the LAN 21), the management application collects device information on printing devices on the network.

The collection of the device information on printing devices is performed as follows. regarding network printers, the management application transmits an SNMP command requesting for transmission of an address by broadcast for all the network printers. After receiving addresses of network printers, the management application transmits a SNMP command requesting for detailed information to a target network printer. The targeted network printer returns a response to the management application. Thus, the management application collects the device information on targeted network printers. The communication between the device management server 1 and the network printer may be executed under a standard protocol based on an RFC (Requests For Comments) 1157.

Regarding local printers, the management application transmits a command requesting for detailed information on a local printer to the PC 3a or 3b by broadcast so that device information on local printers can be collected and the collected information can be displayed on the device management server 1. In this phase, the relaying application running on the PC 3a or 3b receives the command from the device management server 1, and obtains information on a connection port of a printer driver installed on the PC (3a or 3b) and a model name of a local printer directly connected to the PC (3a or 3b). The relaying application then obtains a serial number of a local printer through the printer driver, and returns the obtained information to the device management server 1 together with its own name, IP address and MAC address. The communication between the device management server 1 and the PC 3a or 3b may be executed under one of standard protocol based on an RFC (Requests For Comments). A protocol to be used may be determined by negotiation between the device management server 1 and the PC (3a or 3b).

Based on the device information on printing devices collected as described above, the management application generates a web page for displaying device information, and transmits the web page to web browser of the PC 2 under HTTP (HyperText Transfer Protocol).

The web browser displays a printer list screen 31 (see FIG. 2) based on data of a web page for processing device information on printing devices. As shown in FIG. 2, on the printer list screen 31, an icon (32a to 32e), a device type, a connection type (local connection/network connection), an IP address of a HOST computer are displayed for each of the printing devices. The printer list screen 31 is configured such that the administrator is able to designate a target printing device (for which the administrator wants to change device information) by moving a cursor to an icon (32a to 32e) of the target printing device and pressing (clicking) a button using a pointing device. It is also possible to designate more than one printing device on the printer list screen 31.

After the target printing device is designated, the web browser of the PC (3a or 3b) provides information for designation target printing devices for the management application running on the device management server 1. The management application then obtains a list of target printing devices from the information provided by the web browser, and generates data of a web page for displaying an input screen through various types of setting information for each of target printing devices can be inputted. The generated data is then transmitted to the web browser on the PC 2 under HTTP. The above mentioned sequence of data transmission can be achieved, for example, by a CGI (Common Gateway Interface).

Under control of the web browser of the PC 2, a setting input screen 41 is displayed on the PC 2 based on the data of the web page for displaying an input screen received from the management application. As shown in FIG. 3, the setting input screen 41 includes a list 42 of the target printing devices designated on the printer list screen 31, a form 43 for inputting setting information for each of the target printing devices. The form is described by HTML.

As shown in FIG. 3, the form 43 includes a pull-down menu, a radio button, and a text box for each of setting items of "Emulation", "Feeder", "Duplex Mode", "Duplex Binding", etc. The administrator is allowed to change data of the form by using a keyboard and a pointing device (provided in the operation unit), and is allowed to request the management application to apply change of the setting information for all of the target printing devices displayed on the target printer list 42 at a time.

A unique ID is assigned to each of the setting items. Therefore, when a "Submit" button 44 is pressed, the web browser generates a CGI parameter representing an ID number of setting items for which the setting information is changed and changed setting values, and to transmit the CGI (Common Gateway Interface) parameter to a CGI program of the management application so as to activate the CGI program.

Figure 4:
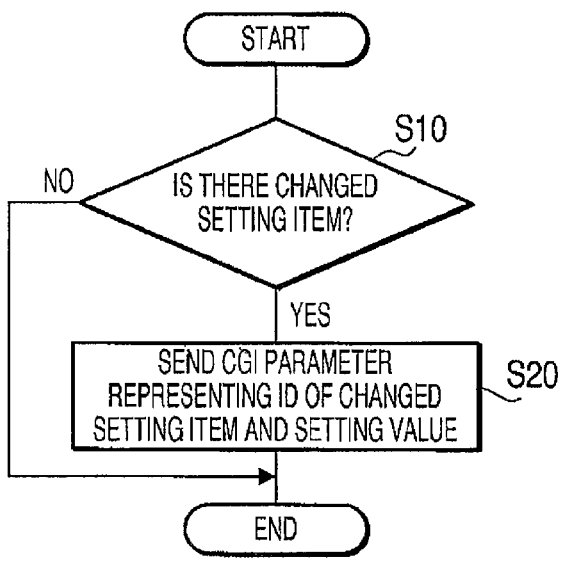
FIG. 4 is a flowchart illustrating a process in which the web browser of the PC transmits a CGI parameter requesting change of setting information of target printing devices to a management application.

FIG. 4 is a flowchart illustrating a process in which the web browser of the PC 2 transmits a CGI parameter requesting change of setting information of target printing devices to the management application. When the "Submit" button 44 is pressed, the web browser judges whether there is a setting item for which setting information is changed (step S10). If no item for which setting information is changed is found (S10: NO), the process terminates. If a setting item for which setting information is changed is found (S10: YES), an ID number of the setting item and a CGI parameter representing a changed value of the setting item are transmitted to the management application of the device management server 1 (step S20).

Figure 5:
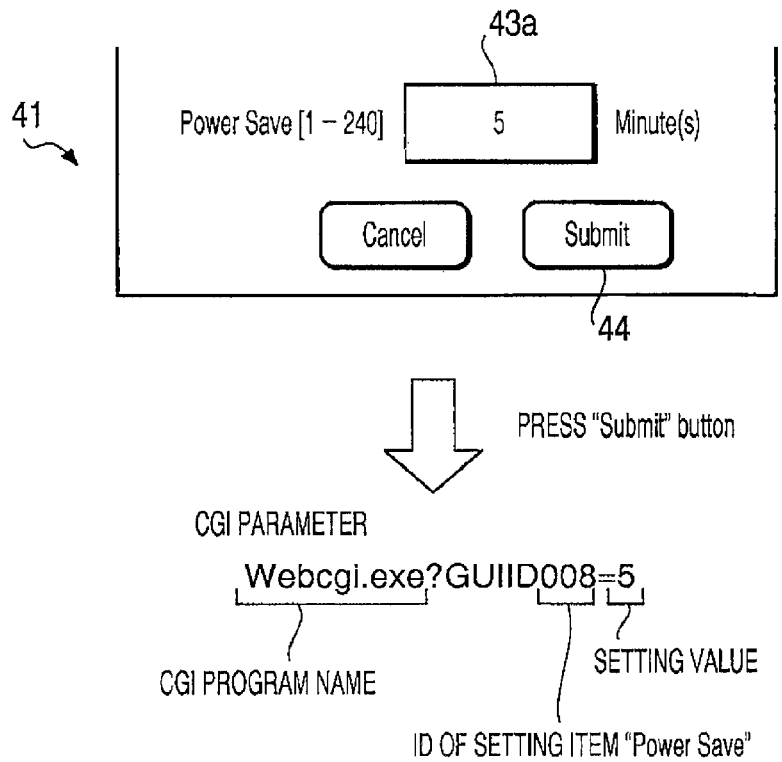
FIG. 5 illustrates an example of a CGI parameter transmitted from the web browser of the PC during the process shown in FIG. 4.

FIG. 5 illustrates an example of a CGI parameter transmitted from the web browser of the PC 2 during the process shown in FIG. 4. More specifically, the CGI parameter shown in FIG. 5 is an example of a CGI parameter generated to change setting information of the setting item "Power Save" used to designate a waiting time that elapses until the printing device moves to a power saving mode.

If the standby time is set for five minutes, the administrator inputs "5," to the text input box 43*a* of the setting input screen 41 using, for example, the keyboard. Then, the administrator presses "Submit" button 44. When the "Submit" button 44 is pressed, the web browser generates the CGI parameter configured such that the ID number assigned to the setting item of "Power Save" and the changed setting value are combined.

In the example shown in FIG. 5, an ID number (GUIID) 008 is assigned to the setting item "Power Save". Consequently, a CGI parameter "Webcgi.exe?GUIID008=5" is generated. The CGI parameter "Webcgi.exe?GUIID008=5" means that the ID number "008" and the setting value "5" are passed to a CGI program "Webcgi.exe" to be executed under control of the management application of the device management server 1.

When the management application received the CGI parameter requesting the change of the setting information of the printing device, the management application executes the CGI program "Webcg.exe" reflecting the CGI parameter.

Figure 6:
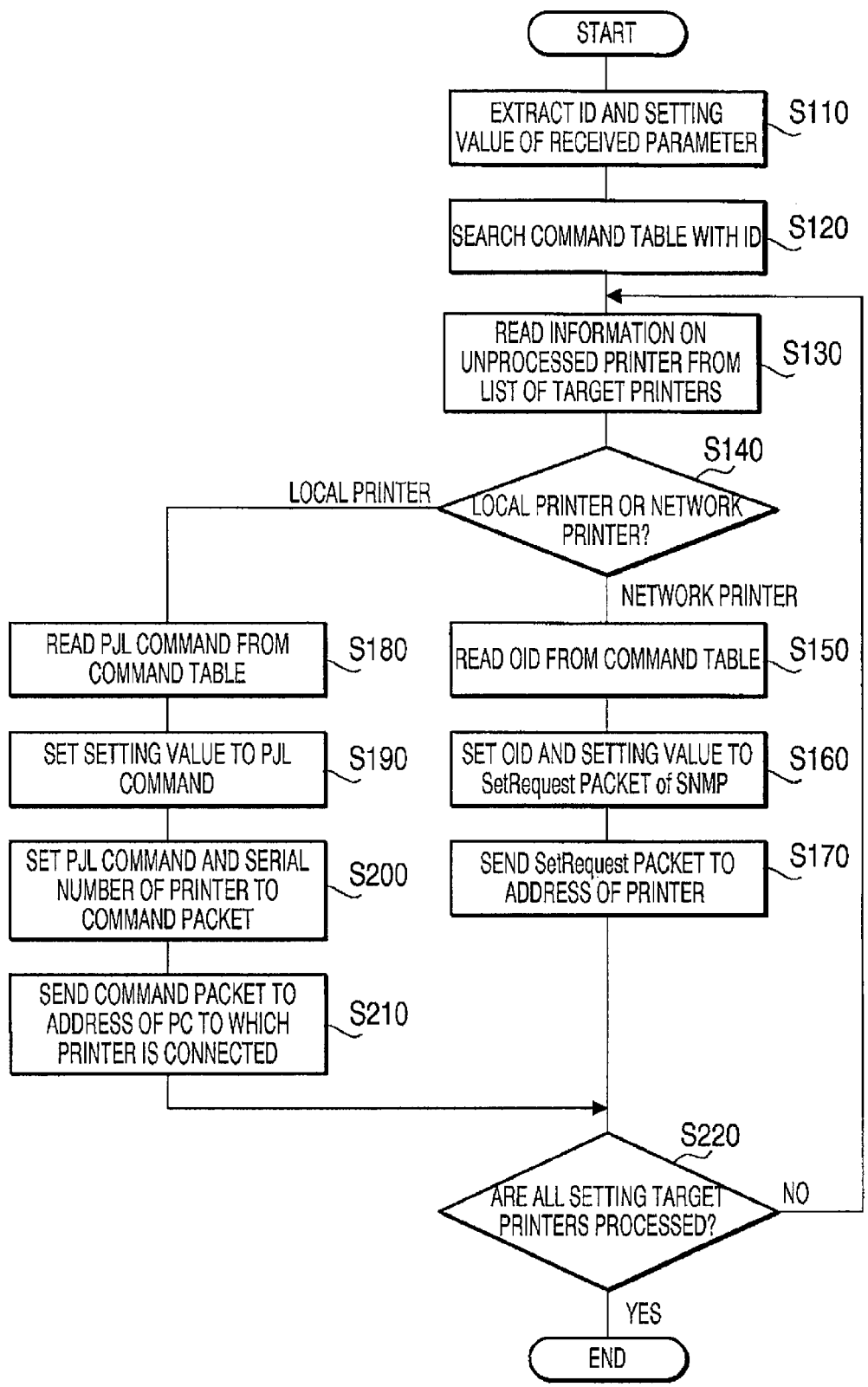
FIG. 6 is a flowchart illustrating a process executed by a CGI program "Wbcgi.exe" executed under control of the management application.

FIG. 6 is a flowchart illustrating a process executed by the CGI program "Wbcgi.exe" executed under control of the management application. As shown in FIG. 6, when the management application receives the CGI parameter requesting the change of the setting information of the printing device from the web browser of the PC 2, the ID number and the setting value are extracted from the CGI parameter (step S110). Based on the ID number obtained in step S110, the management application searches a command table 51 (see FIG. 7) for a command matching the ID number (step S120).

Figures 7, 8:
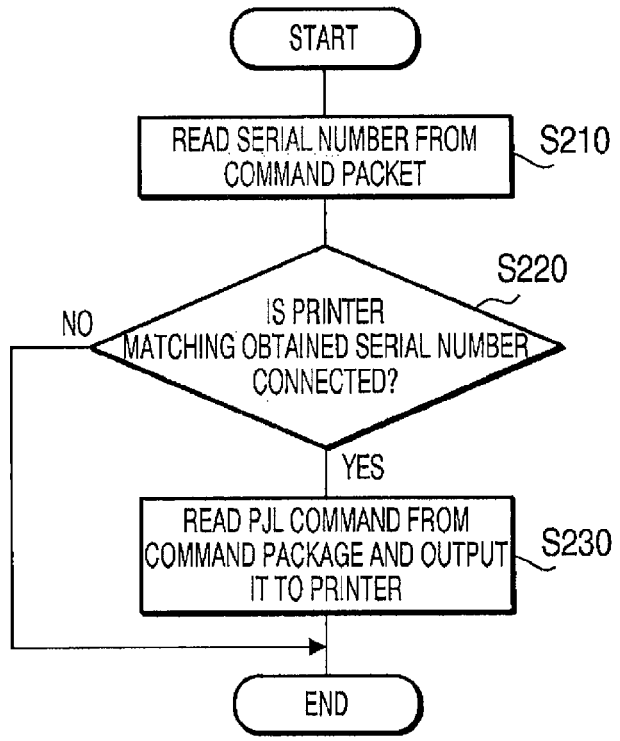
FIG. 7 illustrates a data structure of a command table stored in a storage unit of a device management server.
FIG. 8 is a flowchart illustrating a process which is executed by a relaying application when the relaying application receives a command packet from the device management server.

FIG. 7 illustrates a data structure of the command table 51 stored in the storage unit 12 of the device management server 1. As shown in FIG. 7, the command table 51 is a database in which a command for changing setting information used for a network printer and a command for changing setting information used for a local printer are associated with an ID number for each of the setting items. More specifically, the command table 51 stores, for each of the ID numbers, an MIB object used under SNMP as a command supporting a network printer, and a PJL command (a command described by PJL) as a command supporting a local printer.

The OID of the MIB means an identifier assigned to each of pieces of information stored in the MIB of the SNMP agent (i.e., the network printer). The SNMP manager (i.e., the management application) is able to obtain and change an object corresponding to a designated OID by communicating the agent to designate the OID.

Referring back to FIG. 6, after searching the command table in step S120, the management application selects one printing device (i.e., an unprocessed printing device) from the targeted printing devices, and reads information of the selected device from the table (step S130). Then, the management application judges whether the selected printing device is a network printer or a local printer (step S140).

If the selected printing device is a network printer (S140: "network printer"), the management application reads OID of the selected from the filed of the command searched for in step S120 (step S150). Then, the management application writes the OID and the setting value in a packet (hereafter, referred to as "SetRequest packet") used for transmitting a management command "SetRequest" which is one of management commands under SNMP (step S160). The "SetRequest" is a command requesting for change of information of the object corresponding to the designated OID.

Next, the management application transmits the Setrequest packet to the address of the targeted network printer. (step S170). It should be noted that the sequence of steps S150 to S170 is based on management of network devices under SNMP.

When the network printer receives the SetRequest packet from the device management server 1, the network printer changes information of the object of MIB to the designated setting value based on the OID and the setting value contained in the received packet. Thus, the change of setting information for the network printer is achieved.

For example, change of setting information for a network printer is performed as follows. When a value of the setting item "Power Save" is changed to 5 on the setting input screen 41, an OID 52 "1.3.6.1.4.12435.2.3.9.4.2.1.0.1.1.1.0" corresponding to an ID number 008 of a setting item "Power Save" is read from the command table 51 (see FIG. 7). The OID52 is an identifier of an object defining a waiting time that elapses until a printing device moves to a power saving mode. Then, the OID52 and the setting value "5" are included in a SetRequest packet requesting for change of the waiting time, and the SetRequest packet is sent to the targeted network printer.

Referring back to FIG. 6, if it is judged in step S140 that the selected printing device is a local printer (S140: "local printer"), a PJL command is read from the field of the command searched for in step S120 (step S180). Then, the setting value is included in the PJL command (step S190).

Next, the management application writes the PJL command to which the setting value is added and serial number of the selected local printer in a packet (hereafter, referred to as a command packet) used for transmitting a management command to the relaying application of the PC 3 to which the targeted local printer is connected (step S200). Then, the management application transmits the command packet to the relaying application of the PC 3 to which the targeted local printer is connected (step S210).

For example, change of setting information for a local printer is performed as follows. When a value of a setting item "Power Save" is changed to "5" on the setting input screen 41, a PJL command 53 "@PJL SET POWERSAVETIME=" corresponding to an ID number 008 of the setting item "Power Save" is read from the command table 51 (see FIG. 7). The PJL command 53 is a PJL command for defining a waiting time that elapses until a printing device moves to a power saving mode. In this case, the setting value "5" is set to the PJL command 53. That is, a character string "@PJL SET POWERSAVETIME=5" is created.

Next, the PJL command 53 to which the setting value "5" is set and serial number of the targeted local printer are included in the command packet for transmitting the management command to the relaying application of the PC 3. Then, the command packet is transmitted to the relaying application of the PC 3 to which the targeted local printer is connected.

Referring back to FIG. 6, after transmitting the packet of the management command in step S170 or S210, the management application judges whether the transmission of the management command is completed for all of the printing devices included in the list of the targeted printing devices (step S220). If all the targeted printing devices have not been processed (S220: NO), control returns to step S130 to processes a next unprocessed printing device. If all of the targeted printing devices have been processed (S220: YES), the process of "Webegi.exe" terminates.

FIG. 8 is a flowchart illustrating a process which is executed by the relaying application when the relaying application receives a command packet from the device management server 1. When the relaying application receives a command packet from the device management server 1, the relaying application reads a serial number of a targeted printing device from the received command packet (step S210). Then, the relaying application judges whether a printing device matching the read serial number is connected to the PC on which the relaying application runs (step S220).

If the relaying application judges that a printing device matching the serial number is connected to the PC on which the relaying application runs (S220: YES), the relaying application reads a PJL command from the command packet and sends the PJL command to the targeted printing device (step S230). Then, the process terminates.

The local printer which received the PJL command from the relaying application changes its setting information to the value designated by the PJL command. The change of setting information for a local printer is thus achieved.

If it is judged in step S220 that a printing device matching the serial number is not connected to the PC on which the relaying application runs (S220: NO), the process terminates.

In the above mentioned process executed by the relaying application, the PJL command is transmitted only to a local printer matching the serial number designed by the command packet even if more than one local printer is connected to the PC on which the relaying application runs.

As according to the embodiment, there is no need to cause the PC 3a or 3b (to which a local printer is connected) to function as a management target device under SNMP. In other words, the PC to which a local printer is connected is not required to have a dedicated application functioning to enable the PC to which a local printer is connected to support SNMP.

The device management server 1 stores commands (OIDs) for network printers and PJL commends for local printers in the command table 51 such that an OID and a PJL command are associated with an ID of corresponding setting item. Further, the device management server 1 reads the OID or the PJL command from the command table 51 in accordance with the type of a printing device (local printer or network printer) and generates the management command to transmit the command. With this configuration, it is possible to appropriately apply changed setting information to a targeted printing device regardless of whether the targeted printing device is a network printer or a local printer. That is, it is possible to appropriately manage the local and network printers while enabling the administrator appropriately distinguishing the local printer from the network printer.

When the device management server 1 transmits the management command to be applied to a local printer, the device management server 1 transmits the PJL command to the PC 3a or 3b together with the serial number of the targeted local printer. Therefore, the PC 3a or 3b is able to identify a targeted local printer to which the setting information is to be applied through use of the serial number. Such a configuration makes it possible to cause only an appropriate PC selected from one or more PCs to execute the PJL command. Consequently, even if more than one local printer is connected to the PC 3a or 3b, the device management server 1 is able to change setting information only for a targeted local printer.

As described above, the printer list screen 31 is generated based on information on printing devices collected by the device management server 1 and the printer list screen 31 is provided for the PC 2 in the form of a web page. Since the information indicating whether a printing device is a local printer or a network printer is displayed on the web browser on the PC2, the administrator is able to easily recognize a targeted printing device is a local printer or a network printer.

Since the administrator is able to select more than one printing device as a target through the printer list screen 31, the administrator is able to request change of the settings for all of the targeted printing devices at a time.

Although the present invention has been described in considerable detail with reference to certain preferred embodiments thereof, other embodiments are possible.

For example, although in the above mentioned embodiment the administrator accesses the device management server 1 from the PC 2 and management of printing devices is achieved through the printer list screen 31 or the setting input screen 41 displayed on the PC 2 by the web browser, the printer management system 100 may be configured such that the administrator is allowed to directly manage the printing devices through the device management server 1. In this case, the GUI screens (e.g., the printer list screen 31 or the setting input screen 41) are displayed on the display of the device management server 1 and the administrator is able to directly operate the device management server 1 to manage the printing devices.

What is claimed is:

1. A device management system, comprising:
   at least one first device connected to a network;
   a personal computer connected to the network;
   at least one second device connected to the personal computer, wherein the at least one second device communicates with the network exclusively via the personal computer; and
   a management device connected to the network;
   wherein the management device comprises:
      a search unit configured to transmit a search packet to the network to search for at least one of the at least one first device and the at least one second device;
      a list generation unit configured to generate a device list, which comprises device information about each of the at least one first device and the at least one second device from which a reply to the search packet is received;
      a request judgment unit configured to accept a request regarding management of one of the at least one first device and the at least one second device and to judge whether a target device of the request is the at least one first device or the at least one second device;
      a database storing first commands for the at least one first device and second commands for the at least one second device, wherein each type of request is associated with a first command and a second command;

a first management command generation unit configured such that, if the request judgment unit judges that the target device of the accepted request is the at least one first device, the first management command generation unit reads the first command associated with the type of request matching the accepted request from the database, generates a first management command using the read first command, and transmits the first management command to the at least one first device in accordance with a first protocol; and a second management command generation unit configured such that, if the request judgment unit judges that the target device of the accepted request is the at least one second device, the second management command generation unit reads the second command associated with the type of request matching the accepted request from the database, generates a second management command using the read second command, and transmits the second management command to the personal computer in accordance with a second protocol, wherein the personal computer is configured to have a device driver installed thereon, wherein the personal computer comprises:

a reply unit configured to return combined information when both the personal computer receives a search packet and the personal computer has a second device driver associated with the second device installed thereon, the combined information comprising information associated with the at least one second device and address information of the personal computer; and a command relaying unit configured to receive the second management command from the management device and to send the second management command to the at least one second device, wherein the list generation unit generates the device list such that device information for the at least one first device is related to a reply from the at least one first device, and device information for the at least one second device is related to the combined information received from the personal computer, wherein, in the device list, the device information for the at least one first device includes identification information of the at least one first device and a first device network address, and the device information for that at least one second device includes identification information of the at least one second device and a personal computer network address, wherein the first management command generation unit is configured to transmit the first management command to the first device network address and the second management command generation unit is configured to transmit the second management command to the personal computer network address; and wherein the request judgment unit is configured to accept the request if the target device is listed in the device list generated by the list generation unit, and to judge whether the target device is the at least one first device or the at least one second device based on device information of the target device in the device list.

2. The device management system according to claim 1, wherein the first protocol is a predetermined network device management protocol through which the management device is allowed communicate with the at least one first device to manage the at least one first device and is not allowed to communicate with the at least one second device to manage the at least one second device.

3. The device management system according to claim 1, wherein the management device comprises a storage unit in which the database is stored.

4. The device management system according to claim 1, wherein the at least one second device comprises a plurality of second devices;

the second management command generation unit transmits the second management command together with an identification of a target second device which is one of the plurality of second devices and which corresponds to the target device; and the command relaying unit of the personal computer sends the second management command to the target second device designated by the identification sent from the management device together with the second management command.

5. The device management system according to claim 1, wherein the management device further comprises:

an information output unit configured to output information indicating, for each of devices directly or indirectly connected to the network, whether each of the devices directly or indirectly connected to the network is the at least one first device or the at least one second device, wherein the request judgment unit accepts the request which is inputted to the management device through a user operation conducted on the information outputted by the information output unit.

6. The device management system according to claim 1, wherein:

in response to accepting a plurality of requests regarding management of the at least one first device and the at least one second device, the request judgment unit judges, for each of the plurality of requests, whether a target device of each request is the at least one first device or the at least one second device.

7. A management device connected to a network, comprising:

a search unit configured to transmit a search packet to the network to search for at least one of at least one first device, which is connected to the network, and at least one second device, which is connected to a personal computer connected to the network, wherein the at least one second device communicates with the network exclusively via the personal computer and wherein the personal computer is configured to have a device driver for the second device installed thereon;

a list generation unit configured to generate a device list, which comprises device information about each of the at least one first device and the at least one second device from which a reply to the search packet is received;

a request judgment unit configured to accept a request regarding management of one of the at least one first device and the at least one second device, and to judge whether a target device of the request is the at least one first device or the at least one second device;

a database storing first commands for the at least one first device and second commands for the at least one second device, wherein each type of request is associated with a first command and a second command;

a first management command generation unit configured such that if the request judgment unit judges that the target device of the accepted request is the at least one first device, the first management command generation unit reads the first command associated with the type of request matching the accepted request from the database, generates a first management command using the read first command, and transmits the first management command to the at least one first device in accordance with a first protocol; and a second management command generation unit configured such that if the request judgment unit judges that the target device of the accepted request is the at least one second device, the second management command generation unit reads the second command associated with the type of request matching the accepted request from the database, generates a second management command using the read second command, and transmits the second management command to the personal computer in accordance with a second protocol, wherein the list generation unit generates the device list such that device information for the at least one first device is related to a reply from the at least one first device, and device information for the at least one second device is related to combined information received from the personal computer, wherein the combined information comprises information associated with the at least one second device and address information of the personal computer, wherein, in the device list, the device information for the at least one first device includes identification information of the at least one first device and a first device network address, and the device information for that at least one second device includes identification information of the at least one second device and a personal computer network address, wherein the first management command generation unit is configured to transmit the first management command to the first device network address and the second management command generation unit is configured to transmit the second management command to the personal computer network address; and wherein the request judgment unit is configured to accept the request if the target device is listed in the device list generated by the list generation unit, and to judge whether the target device is the at least one first device or the at least one second device based on device information of the target device in the device list.

8. The management device according to claim 7, wherein the first protocol is a predetermined network device management protocol through which the management device is allowed communicate with the at least one first device to manage the at least one first device and is not allowed to communicate with the at least one second device to manage the at least one second device.

9. The management device according to claim 7, further comprising a storage unit in which the database is stored.

10. The management device according to claim 7, further comprising:

an information output unit configured to output information indicating, for each of devices directly or indirectly connected to the network, whether each of the devices directly or indirectly connected to the network is the at least one first device or the at least one second device, wherein the request judgment unit accepts the request which is inputted to the management device through a user operation conducted on the information outputted by the information output unit.

11. The management device according to claim 7, wherein:

in response to accepting a plurality of requests regarding management of the at least one first device and the at least one second device, the request judgment unit judges, for each of the plurality of requests, whether a target device of each request is the at least one first device or the at least one second device.

12. A non-transitory computer readable medium having computer readable instruction stored thereon, which, when executed by a processor of a management device, configures the processor to perform the steps of:

transmitting a search packet to a network to search for at least one of at least one first device, which is connected to the network, and at least one second device, which is connected to a personal computer connected to the network, wherein the at least one second device communicates with the network exclusively via the personal computer and wherein the personal computer is configured to have a device driver for the second device installed thereon;

generating a device list, which comprises device information about each of the at least one first device and the at least one second device from which a reply to the search packet is received;

accepting a request regarding management of one of at least one first device and at least one second device;

judging whether a target device of the request is the at least one first device or the at least one second device;

if it is judged that the target device of the accepted request is the at least one first device, reading a first command associated with a type of request matching the accepted request from a database generating a first management command using the read first command, and transmitting the first management command to the at least one first device in accordance with a first protocol, wherein the database stores first commands for the at least one first device and second commands for the at least one second device, wherein each type of request is associated with a first command and a second command; and if it is judged that the target device of the accepted request is the at least one second device, reading the second command associated with the type of request matching the accepted request from the database, generating a second management command using the read second command, and transmitting the second management command to the personal computer in accordance with a second protocol:

wherein the device list is generated such that device information for the at least one first device is related to a reply from the at least one first device and device information for the at least one second device is related to combined information received from the personal computer, wherein the combined information comprises information associated with the at least one second device and address information of the personal computer, wherein, in the device list, the device information for the at least one first device includes identification information of the at least one first device and a first device network address, and the device information for that at least one second device includes identification information of the at least one second device and a personal computer network address, wherein the first management command is transmitted to the first device network address and the second management command is transmitted to the personal computer network address; and wherein the request is accepted if the target device is listed in the generated device list, and it is judged whether the target device is the at least one first device or the at least one second device based on device information of the target device in the device list.

13. The computer readable medium according to claim 12, wherein the first protocol is a predetermined network device management protocol through which the management device is allowed communicate with the at least one first device to manage the at least one first device and is not allowed to communicate with the at least one second device to manage the at least one second device.

14. The computer readable medium according to claim 12, wherein the instruction further configures the processor to perform the steps of:
    outputting information indicating, for each of devices directly or indirectly connected to the network, whether each of the devices directly or indirectly connected to the network is the at least one first device or the at least one second device; and
    accepting the request which is inputted to the management device through a user operation conducted on the information outputted by the information output unit.

15. The computer readable medium according to claim 12, wherein the instruction further configures the processor to perform the steps of:
    in response to accepting a plurality of requests regarding management of the at least one first device and the at least one second device, judging, for each of the plurality of requests, whether a target device of each request is the at least one first device or the at least one second device.

16. A device management system, comprising:
    at least one first device connected to a network;
    a personal computer connected to the network;
    at least one second device connected to the personal computer, wherein the at least one second device communicates with the network exclusively via the personal computer; and
    a management device connected to the network,
    wherein the management device comprises:
        a search unit configured to transmit a search packet to the network to search for at least one of the at least one first device and the at least one second device;
        a list generation unit configured to generate a device list, which comprises device information about each of the at least one first device and the at least one second device from which a reply to the search packet is received;
        a request accepting unit configured to accept a request regarding management of one of the at least one first device and the at least one second device; and
        a controller that converts information associated with the request to a command, according to whether the request is targeted for the at least one first device or the at least one second device, and that transmits the command to one of the at least one first device and the personal computer, according to whether the request is targeted for the at least one first device or the at least one second device,
    wherein the personal computer is configured to have a device driver installed thereon,
    wherein the personal computer comprises:
        a reply unit configured to return combined information when both the personal computer receives a search packet and the personal computer has a second device driver associated with the second device installed thereon, the combined information comprising information associated with the at least one second device and address information of the personal computer; and
        a command relaying unit configured to receive the command from the controller of the management device and to send the received command to the at least one second device,
    wherein the list generation unit generates the device list such that device information for the at least one first device is related to a reply from the at least one first device, and device information for the at least one second device is related to the combined information received from the personal computer,
    wherein, in the device list, the device information for the at least one first device includes identification information of the at least one first device and a first device network address, and the device information for that at least one second device includes identification information of the at least one second device and a personal computer network address,
    wherein the controller is configured to transmit the command to the first device network address if the request is targeted to the first device and to transmit the command to the personal computer network address if the request is targeted to the second device; and
    wherein the request accepting unit is configured to accept the request if the target device is listed in the device list generated by the list generation unit.

17. A device management system, comprising:
    at least one first device connected to a network;
    a personal computer connected to the network;
    a plurality of second devices connected to the personal computer, wherein the plurality of second devices each communicate with the network exclusively via the personal computer; and
    a management device connected to the network,
    wherein the management device comprises:
        a search unit configured to transmit a search packet to the network to search for at least one of the at least one first device and the plurality of second devices;
        a list generation unit configured to generate a device list, which comprises device information about each of the at least one first device and the plurality of second devices from which a reply to the search packet is received;
        a request accepting unit configured to accept a request regarding management of one of the at least one first device and the plurality of second devices; and
        a controller configured such that, if one of the plurality of second devices is designated as a target device in the accepted request, the controller transmits a command corresponding to the request and an identification of the target device to the personal computer,
    wherein the personal computer is configured to have a device driver installed thereon for each of the plurality of second devices,
    wherein the personal computer comprises:
        a reply unit configured to return combined information when both the personal computer receives a search packet and the personal computer has a device driver associated with at least one of the plurality of second devices installed thereon, wherein the combined information comprises information associated with each of the plurality of second devices for which the personal computer has a device driver installed thereon and address information of the personal computer; and
        a command relaying unit configured to receive the command from the controller of the management device and to send the received command to the target device in accordance with the identification transmitted from the management device together with the command, wherein the list generation unit generates the device list such that device information for the at least one first device is related to a reply from the at least one first device, and device information for the plurality of second devices is related to the combined information received from the personal computer, wherein, in the device list, the device information for the at least one first device includes identification information of the at least one first device and a first device network address, and the device information for each particular second device of the plurality of second devices includes identification information for the particular second device and a personal computer network address, wherein the controller is configured to transmit the command to the personal computer network address; and wherein the request accepting unit is configured to accept the request if the target device is listed in the device list generated by the list generation unit.

* * * * *